United States Patent Office 2,993,776
Patented July 25, 1961

2,993,776
CONTROLLING VEGETATION
John P. Chupp, Nitro, W. Va., assignor to Monsanto Chemical Company, St. Louis, Mo., a corporation of Delaware
No Drawing. Filed Oct. 8, 1956, Ser. No. 614,365
10 Claims. (Cl. 71—2.7)

This invention relates to methods of destroying or controlling vegetation and to herbicidal compositions. More particularly it relates to methods of destroying or controlling vegetation which comprises applying thereto a vinyl ester of a phosphoroamidic acid.

General objects of the invention are to provide compositions which are toxic to living plants and to provide methods for their use. Another object is to destroy noxious vegetation either in the form of germinating seeds or by application of the toxicant to the foliage after emergence. Other and further objects will be apparent from the detailed description which follows.

The phytotoxic vinyl esters of phosphoroamidic acids comprise weed killers having both pre-emergence and post-emergence activity. Accordingly, by applying the toxicant to the plant is meant any means whereby the toxicant is brought into contact with living plants which latter include germinating seedlings, as for example by application to the ground before the plants emerge or by direct application to the foliage.

The active components of the new herbicidal compositions are characterized by the presence of at least one nitrogen atom attached directly to a phosphorus (V) acid ester in which the ester group is a vinyl or substituted vinyl radical. The chlorovinyl esters of tetraalkyl- or tetraalkenylphosphorodiamidic acids are preferred for reasons of economy, ease of preparation and outstanding activity. Vinyl phosphoroamidates may be prepared by condensing esters of phosphorus (III) amides with alpha halogenated aldehydes or ketones. It is now recognized that this reaction yields vinyl phosphates instead of the normal Michealis-Arbuzov reaction. However, this invention is not concerned with the method of synthesis and is not limited thereby.

Typical examples of herbicidally active esters comprise vinyl tetrapropylphosphorodiamidate,
2,2-dichlorovinyl tetrapropylphosphorodiamidate,
2-chlorovinyl tetrapropylphosphorodiamidate,
2-bromovinyl tetraisopropylphosphorodiamidate,
2,2-dichloro-1-trichloromethylvinyl tetrapropylphosphorodiamidate,
2,2-dichlorovinyl tetramethylphosphorodiamidate,
2,2-dibromovinyl tetraallylphosphorodiamidate,
2-chlorovinyl tetraethylphosphorodiamidate,
2-chlorovinyl tetrabutylphosphorodiamidate,
2,2-dichlorovinyl tetraethylphosphorodiamidate,
1-dichlorofluoromethyl-2,2-difluorovinyl tetrapropylphosphorodiamidate and
2,2-dichloro-1-pentylvinyl tetrapropylphosphorodiamidate.

The new toxicants may be applied conveniently in the form of a spray containing the active ingredient in a concentration within the range of 0.1% to 10% by weight. Thorough coverage of the foliage is desirable. Both grasses and broadleaved plants are effectively controlled. Weeds from the following plant families are controlled to varying degrees: Leguminoseae, Cucurbitaceae, Umbellifereae, Chenopodiaceae, Amaranthaceae, Convolvulaceae and Polygonaceae. For pre-emergence application amounts within the range of 10 to 60 pounds per acre are recommended.

Most of the chlorovinyl tetraalkylphosphorodiamidates are insoluble in water but they are soluble in common organic solvents. They may be dispersed directly in water or dissolved first in an organic solvent and then dispersed. As dispersing and wetting agents there may be employed soft or hard sodium or potassium soaps, alkylated aromatic sodium sulfonates such as sodium dodecyl benzene sulfonate, or an amine salt or dodecyl benzene sulfonic acid, alkali metal salts of sulfated fatty alcohols, ethylene oxide condensation products of alkyl phenols or tall oil and other dispersing and wetting agents. The herbicides may be formulated and applied as dry compositions by mixing the toxicant with a finely divided solid carrier, as for example talc, clay, pyrophyllite, silica and fuller's earth. Alternatively, the dry, solid, free-flowing mixture of the chlorovinyl phosphorodiamidate and solid carrier may be dispersed in water and applied as a spray.

The tables below illustrate characteristic herbicidal activity of typical chlorovinyl tetraalkylphosphorodiamidates. The toxicant was emulsified in water and the emulsion applied as a spray. In the foliage tests the spray containing the concentration of the active ingredient shown in the table was applied to the foliage of grass and to the foliage of bean plants and finally to the foliage of a mixture of broadleaved plants and the effect recorded. In the pre-emergence tests the spray was applied to the ground of seeded plots before the grass or other plants emerged. The following phytotoxicity rating key was used:

|  | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 |  |
| Defoliation | B |  |

TABLE I

Contact

|  | Toxicant | Conc., Percent | Phytotoxicity Rating | | |
|---|---|---|---|---|---|
|  |  |  | Grass | Bean | Broadleaf |
| 1 | 2,2-Dichlorovinyl tetraethylphosphorodiamidate | 0.5 | 3+ | 3+ | 4 |
| 2 | 2,2-Dichlorovinyl tetrapropylphosphorodiamidate | 0.5 | 4 | 4 | 4 |
| 3 | 2-Chlorovinyl tetraethylphosphorodiamidate | 0.5 | 4 | 3+ | 4 |
| 4 | 2,2-Dichloro-1-trichloromethylvinyl tetrapropylphosphorodiamidate | 0.5 | 3+ | 1+ | 3+ |

The plants employed in the pre-emergence tests are designated by letter in Table II. The plants corresponding to the letters are as follows:

A. Wild oat
B. Brome grass
C. Rye grass (domestic)
D. Buckwheat
E. Mustard (radish)
F. Barnyard grass
G. Beet-sugar
H. Cotton
J. Crabgrass
K. Corn
L. Foxtail
M. Pigweed
N. Annual morning glory

TABLE II

*Pre-emergence*

| Compound No. | Lbs. per Acre | Phytotoxicity Rating | | | | | | | | | | | | |
|---|---|---|---|---|---|---|---|---|---|---|---|---|---|---|
| | | A | B | C | D | E | F | G | H | J | K | L | M | N |
| 1 | 25 | 0 | 2 | 2 | 0 | 3 | 2 | 3 | 0 | 3 | -- | 3 | 3 | 2 |
| 2 | 25 | 1 | 3 | 3 | 1 | 2 | 3 | 3 | 1 | 3 | 0 | 3 | 3 | 2 |
| 4 | 25 | 2 | 3 | 0 | 1 | 0 | 1 | 0 | 1 | 3 | 0 | 3 | 0 | 1 |

It is intended to cover all changes and modifications of the examples of the invention herein chosen for purposes of disclosure which do not constitute departures from the spirit and scope of the invention.

What is claimed is:

1. A method of destroying vegetation which comprises contacting the plant with a phytotoxic concentration of 2,2-dichlorovinyl tetra (lower alkyl) phosphorodiamidate containing more than one carbon atom in each alkyl group.

2. The method of claim 1 in which the toxicant is applied to the ground before the plants emerge.

3. A method of destroying vegetation which comprises applying to the foliage thereof a phytotoxic concentration of 2-chlorovinyl tetra (lower alkyl) phosphorodiamidate.

4. A method of destroying vegetation which comprises applying to the foliage thereof a phytotoxic concentration of a halovinyl tetraalkylphosphorodiamidate conforming to the structure

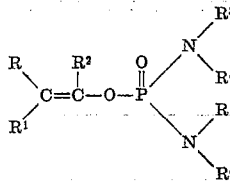

where R and $R^1$ are selected from a group consisting of halogen and hydrogen, $R^2$ is selected from a group consisting of hydrogen, lower alkyl and halogen substituted methyl and $R^3$, $R^4$, $R^5$ and $R^6$ are selected from a group consisting of lower alkyl and allyl.

5. A method of destroying vegetation which comprises applying to the foliage thereof a phytotoxic concentration of 2-chlorovinyl tetraethylphosphorodiamidate.

6. A method of destroying vegetation which comprises applying to the foliage thereof a phytotoxic concentration of 2,2-dichlorovinyl tetrapropylphosphorodiamidate.

7. A method of destroying vegetation which comprises applying to the foliage thereof a phytotoxic concentration of 2,2-dichlorovinyl tetraethylphosphorodiamidate.

8. A method of destroying vegetation which comprises applying thereto a phytotoxic concentration of 2-chlorovinyl tetrapropyl phosphorodiamidate.

9. A method of destroying vegetation which comprises applying thereto a phytotoxic concentration of 2-bromovinyl tetraalkyl phosphorodiamidate wherein the alkyl groups contain 3 carbon atoms.

10. A method of destroying vegetation which comprises applying thereto a phytotoxic concentration of 2,2-dibromovinyl tetraallyl phosphorodiamidate.

References Cited in the file of this patent

UNITED STATES PATENTS

| 2,151,380 | Flint et al. | Mar. 21, 1939 |
| 2,160,842 | Dreyfus | June 6, 1939 |
| 2,172,241 | Dickey et al. | Sept. 5, 1939 |
| 2,502,966 | Kosolapoff | Apr. 4, 1950 |
| 2,587,549 | Trementazzi | Feb. 26, 1952 |
| 2,623,611 | Levine et al. | Dec. 30, 1952 |
| 2,714,064 | Morris et al. | July 26, 1955 |
| 2,765,252 | Pianka | Oct. 2, 1956 |
| 2,814,636 | Stahmann et al. | Nov. 26, 1957 |
| 2,848,492 | Saul et al. | Aug. 19, 1958 |

FOREIGN PATENTS

| 605,268 | Great Britain | July 20, 1948 |
| 691,358 | Great Britain | May 13, 1953 |

OTHER REFERENCES

Ramaswami et al.: "Chemical Abstracts," vol. 46, col. 10244(e), 1952.

Capazzi: "Chemical Abstracts," vol. 48, col. 2307(f), 1954, and corresponding Subject Index, page 1427.